INVENTOR.
HARRY J. ADDISON JR.

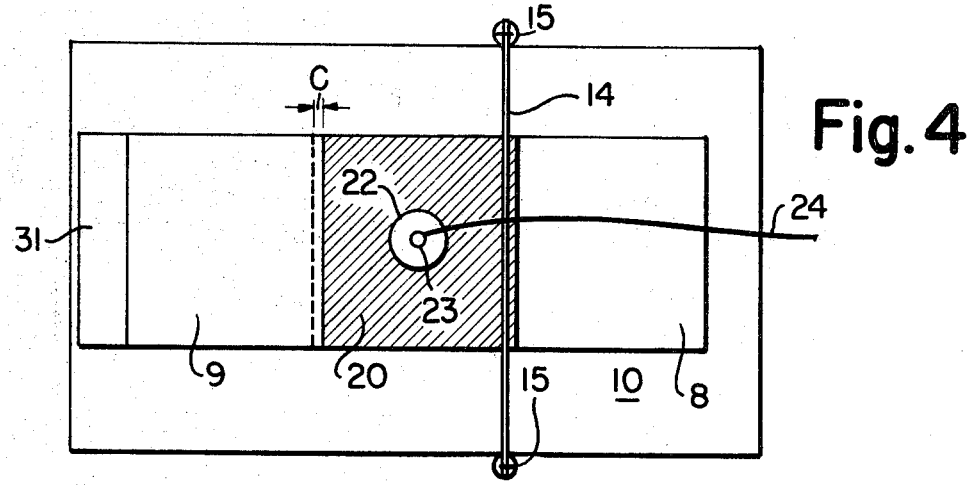
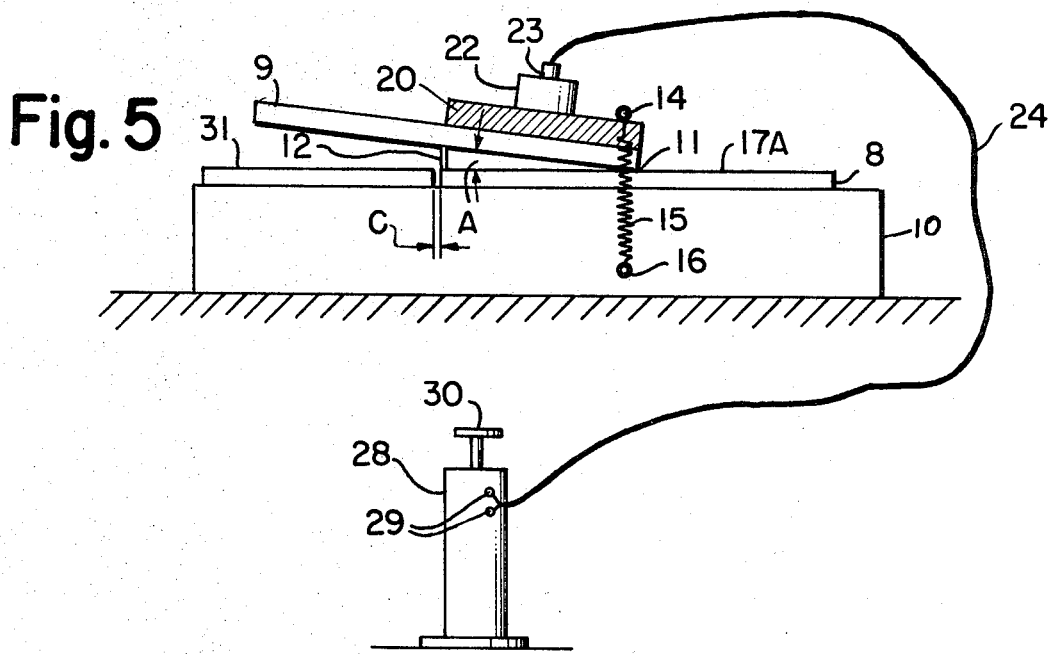

UNITED STATES PATENT OFFICE 3,561,097
Patented Feb. 9, 1971

3,561,097
EXPLOSIVE SPOT WELDING METHOD AND MEANS USING ANGULAR ORIENTATION AT THE WELDED JUNCTION
Harry J. Addison, Jr., Willingboro, N.J., assignor to the United States of America as represented by the Secretary of the Army
Filed May 6, 1968, Ser. No. 726,932
Int. Cl. B23k 21/00
U.S. Cl. 29—470.1                      9 Claims

ABSTRACT OF THE DISCLOSURE

Explosive spot welding of relatively-thin metal alloy plates or sheets may be accomplished by using a very-narrow angle between the plates or sheets to be welded and with a short overlap in which one edge of one sheet intersects the contiguous face of the other sheet, before welding, and forming a line contact. The welding force is applied by an explosive charge which is provided by a relatively small-size pellet placed over the center of the overlap above the upper-most panel or sheet to be joined. Only slight holding force is applied to the parts to be joined and this is only sufficient to hold such parts in position one with respect to the other before the weld takes place.

---

Figure 1:
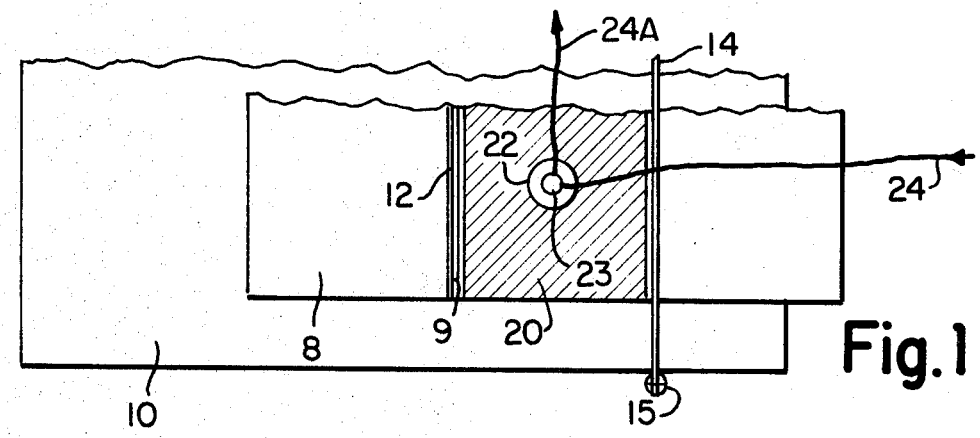

The invention described herein may be manufactured, used and licensed by or for the Government for governmental purposes without the payment to me of any royalty thereon.

The present invention relates to a method and means for the explosive spot welding of relatively-thin aluminum alloy sheets or panels by overlapping at the edges thereof, and has for its primary object to provide an improved method and means for accomplishing this type spot welding using an angular orientation and welding technique at the weld junction.

Whenever it is desired to spot weld aluminum alloys and the like in thin sheet form under production line conditions, resistance spot welding process is usually employed. However, presently-available spot welding methods have not been altogether satisfactory because weld and base metal properties are often deteriorated by the heat of welding. The greatest deterioration apparently is produced by grain boundry and eutectic melting. These conditions produce a zone of weakness in the heat affected zone of the parent metal immediately adjacent to the weld-metal base-metal interface.

In contrast with resistance spot welding, explosive spot welding produces little or no melting at the weld interface. With explosive welding, joining occurs when the adjacent faces of the metals to be welded are oriented properly and projected together by energy released from an explosive source. Generally no effort is made intentionally to provide heat to the operation, although some heat may be generated within the weld due to the absorption of energy. The explosive welding process is therefore very promising for minimizing base metal deterioration such as grain boundry melting due to heat input.

Explosive spot welding, in addition, can prove useful for welding a limited number of items that might not warrant the procurement of elaborate and expensive equipment, such as a resistance spot welder, the price of which, including the cost of installation, may involve many thousands of dollars. Compared with this an explosive welding system such as that provided in accordance with the present invention may involve a cost of not more than one hundred dollars at the most.

The explosive spot welding method and means or system as provided in accordance with the invention, may also be useful for fabricating and repairing structures in locations that would be inaccessible or inconvenient for other processes. It may be applied with suitable precautions and modifications in practically any type of environment, such as deep sea locations, outer space, wooded mountainous terrain, or fabrication shops in populous areas.

In accordance with one embodiment of the invention, a very narrow angle is used between two plates or sheets to be welded, and welding force is applied by an explosive charge which is provided by a relatively small-size tetryl pellet, or the like, over the center of the overlap of the two plates or sheets to be joined. The only holding force is that applied to parts to hold such parts in position prior to welding. In this connection, the holding force should not exceed the yield strength of the parts or plates, that is, the holding force should not cause the members to plastically deform. Specifically, in each case, one edge of one sheet or plate is made to contact the face of the other sheet or plate with a desired overlap and with a very narrow angle therebetween of only a few degrees. More than one explosive pellet may be used and are applied in a row along the edge of the sheet for as great a distance as is desired to be welded and spaced to provide the desired distances between the weld points.

The invention will further be understood from the following description, when considered with reference to the accompanying drawings, and its scope is pointed out in the appended claims.

Figure 2:
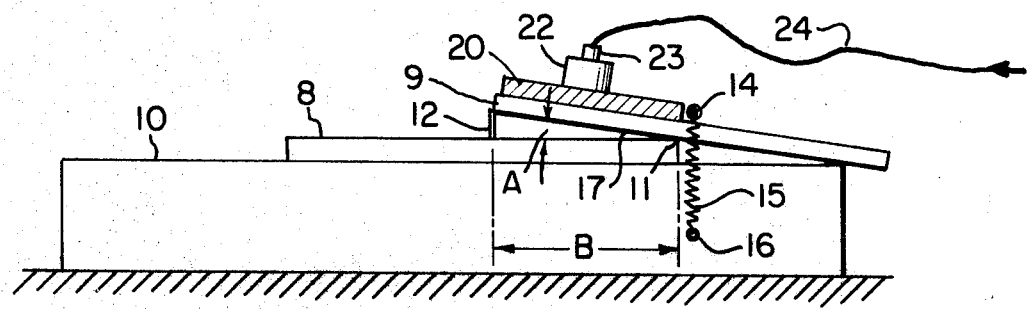
Figure 3:
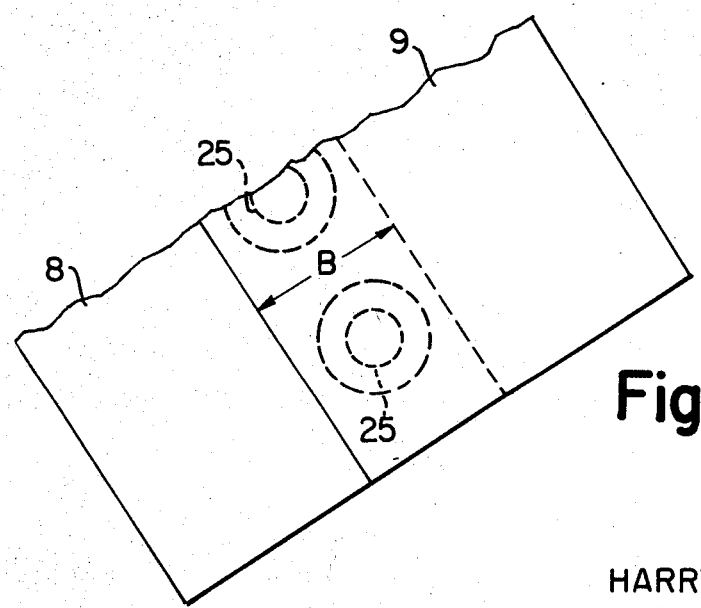

Referring to the drawings:

FIG. 1 is a top or plan view of an explosive spot welding system for aluminum alloy sheets and the like, partly broken away, illustrating the method and means of the present invention, FIG. 2 is a side view, in elevation, of the system of FIG. 1 further showing the relation of various parts thereof in accordance with the invention, FIG. 3 is a fragmentary top view of the finished weld of the system shown in FIG. 1, indicating the various weld areas thereof, FIG. 4 is a top or plan view, corresponding to that of FIG. 1, showing a modification of the arrangement of the various parts, in accordance with the invention, and FIG. 5 is a side view in elevation of the apparatus of FIG. 4 showing further details of construction thereof, and the method of firing the explosive charge.

Referring to the drawings, wherein like parts throughout the various figures are designated by like reference characters and referring particularly to FIGS. 1, 2 and 3, two thin aluminum alloy plates or sheets 8 and 9 are supported on a base or anvil block 10. The plates or sheets 8 and 9 and the block 10 may extend to any desired length and include as many welds as is desired along the overlapping portions of the sheets 8 and 9. The width of this overlap is indicated at B in FIGS. 2 and 3. The plates or sheets may be of aluminum alloy known commercially as 2024–T3 and may be assumed, in the present example, to be substantially $\frac{1}{16}$ inch in thickness each. The base or block 10 is relatively thick and massive to provide a large body or mass of material for absorbing excessive energy imparted to the sheets or plates during welding.

It will be seen that one of the sheets to be welded is in contact with the base anvil block 10, and in the present example this is the lower sheet 8. This sheet engages the upper sheet 9 at a line or contact point 11 and both sheets stand at a very-narrow angle one with respect to the other as indicated by the angle A. This is generally less than five degrees and may be approximately 2½° in the present example, and the overlap may be assumed to be between 2 and 2½ inches at B. The plates or sheets 8 and 9 are held at the desired acute angle by a spacer element 12 which stands edgewise between them and may be made of relatively soft material which will not react chemically with the base members during the welding operation. Relatively-thin cardboard spacers have been found to be suitable for this purpose, and in the present example extend the full length of the sheet as shown in FIGS. 1 and 2.

The two sheets or plates are held in the desired position relative to each other for initiating the weld by only a slight restraining force sufficient to maintain them in this position and in the present example, substantially as shown in FIGS. 1 and 2. This holding force is relatively light and may be supplied by a rod or bar 14 extending across the sheet 9 above and close to the junction or contact line 11 and held at each end by a light retracting spring 15 connected therewith and to a fixed pin 16 one on each side of the block. Only one of the spring ends and pins can be shown in FIGS. 1 and 2 because of the size of the structure in FIG. 1 and thus to save space in the drawing.

It will be noted that in this angular welding technique, the arrangement of the parts to be welded is such that they overlap uniformly and are positioned in contact one with the other so that the edge 11 of the one, which is the plate 8, engages the lower face 17 of the other which is the plate 9, and with the relatively-small acute angle A of 2½°, for example, between them prior to the welding operation. In this position the rear end of the plate 9 extends beyond or overhangs the block 10 in order to permit the proper angular relation between the parts and may be positioned in such a manner as to contact the base for giving support thereto including the spacer 12. In this way the base 10 supports both the upper and lower plate and the welding structure is thus unified therewith, for reasons that will hereinafter appear.

A block or strip of semi-rigid protective material 20 is placed along the surface of the upper plate or sheet 9 and extends therealong directly over the weld area or the overlap B, as indicated more clearly in FIG. 2. This block or strip of protective material may be relatively thick and of slightly-resilient or firm material, such as medium hard rubber, and in the present example may be considered to be at least ½" in thickness. This provides a protective cover or layer and prevents pitting and stress-inducing fracturing in the top plate in response to the welding force delivered by a series of cartridges or pellets along the area in a row.

The pellets or charges, one of which is shown at 22, are positioned directly over the center of the overlap on the top plate in the area or space B, and as many may be used as is desired to provide a line of spot welds. By this means an explosively-welded lap joint may be provided between two plates of relatively thin aluminum alloy using tetryl pellets and these may be positioned effectively at least three inches apart along the length of the overlap to make the line of spot welds.

The pellets may generally be less than one inch in any one dimension and contain a tetryl charge with a density of less than two grams per cubic centimeter. In the present example the single charge or pellet 22 may be considered to be approximately by ¾ of an inch in diameter and ½" thick and to be a tetryl pellet or charge having a density of 1.45 gm./cm.³. This tetryl pellet or charge is detonated by a blasting cap 23 positioned thereon, and, as shown in FIGS. 1 and 2, this may be of the electric type known commercially as a No. 6 or No. 8 electric blasting cap. A two-wire detonating supply cord 24 is connected with detonator or blasting cap 23 and continues on the other cap (not shown), as indicated at 24A for parallel operation of all the caps simultaneously.

When the charges, as shown at 22, are fired through the application of operating current to the firing lead 24, the upper plate or sheet 9 is driven downwardly and comes, with explosive force, into contact with the lower plate or sheet 8 along the weld area included in the overlap B. The excess energy imparted to the plates by the detonating charge is absorbed by the block or anvil element 10 which also serves as a platform for securing the plates as hereinbefore noted. With this system, welds have been produced that are strong enough to force faliure around the peripheries of the weld when tensile shear tested. Fracture occurred at an average load of 5700 pounds with welds of ½" inside diameter and 1" outside diameter. Such welds are indicated in FIG. 3 at 25. These welds are doughnut-shaped with a nugget or weld nugget centrally held therein as indicated.

Several theories have been advanced to explain the mechanism underlining the explosive welding process, and involves the consideration of the impacting velocity of the top member 9 against the bottom member 8, which may generally be designated by the symbol $V_i$, together with the velocity with which the point or line of collision moves along the weld interface over the distance B, called the collision point velocity and designated by the symbol $V_c$. Certain authorities consider that the top member behaves as a jet, traversing a deformable incompressionable base or bottom member, which forms ripples between the metal surfaces that weld when the two members are brought together with suitable impacting velocity ($V_i$) and collision point velocity ($V_c$). It is believed that welding is obtained when the impacting velocity is high enough to produce sufficient pressure at the weld interface and the collision point velocity is less than the sonic velocity of materials to be welded.

Other authorities attribute bonding to a jet which forms by both the upper and lower panels as they come together with a sufficiently high impacting velocity combined with the proper subsonic collision point velocity that forms the members or plates at the interface into two streams at the bonding point. The major stream comprises the weldment and the minor stream forms the jet. Whatever theory may prove to be correct, the use of tetryl pellets with the angular technique as above described, has conclusively demonstrated the ability to produce strong ring-type spot welds in relatively thin aluminum alloy sheets and plates and represents a distinct improvement over prior systems.

Referring now to FIGS. 4 and 5 and the modification of the construction shown in FIGS. 1 and 2, it will be seen that position of the parts or plates 8 and 9 with respect to the contact line 11 have been reversed in that the plate or sheet 9 contacts the upper face 17A of the sheet or plate 8 to form the same narrow angle A between them, and that the two parts are held in prewelding position by the spacer 12 and the light holding means 14–15 comprising the rod and spring combination. Furthermore, the elements 8 and 9 are two narrow plates in the present example, involving only one weld, and the anvil or block 10 is of the same configuration but is not required to extend laterally as in the previous example.

In the present example the lead 24 for firing the single detonator 23 is connected directly to the blasting machine or generator 28 representing any suitable device for this purpose. The lead 24 is connected to the terminals 29 of the generator and the detonator is fired when the handle 30 is raised and lowered to operate generator contained therein, all as well understood.

Furthermore, since the element or plate 9 overhangs the lower plate 8 in this arrangement, a spacer block or plate 31 is provided directly under the overhanging portion of the plate 9, as indicated in FIGS. 4 and 5. This prevents the plate 9 from being deformed or bent over the edge of the lower plate 8 upon firing of the pellet to provide the weld. This spacer plate or plate 31 is preferably of metal and is maintained a predetermined short distance C as indicated in FIGS. 4 and 5 to prevent it from being moved by the lower plate 8 and thus interfering with the welding operation.

As in the preceeding example, the two plates or sheets to be welded are maintained at an acute angle to each other, with the edge of one plate contacting one face of the other plate intermediate between the edges thereof to provide a desired relatively small overlap or weld interface, and the detonating pellet is placed directly over this area in as many places as desired to extend the weld along the line of contact between the two elements or plates.

In contrast with rsistance spot welding, therefore, welding by this system, particularly with aluminum alloy in sheet form, produces little or no melting at the weld surfaces or interface. This type of weld is therefore not subject to deterioration of the materials by any welding heat which may be the case with resistance spot welding for example.

Since a very narrow angle is maintained between the two parts to be welded and the welding force is applied by an explosive pellet of relatively small size, or series of such pellets and preferably several pellets over the center of the overlap, only a slight holding force need be applied, as by the simple means shown, there is no restraint on the elements as they weld. This results in a series of annular-ring-type spot welds, such as referred to in FIG. 3.

I claim:

1. An explosive spot welding system for welding two flat relatively thin metal plates in overlapping relation, comprising in combination:
   a fixed base block providing an anvil for welding operation and for supporting said plates in said overlapping relation one above the other;
   means for maintaining said plates on said block at a predetermined relatively small acute angle one with respect to the other and with one edge of one of said plates contacting a surface of the other of said plates between the edges thereof;
   a series of explosive pellets positioned along the weld area constituted by the overlap of said plate edges;
   means providing a protective layer of resilient material separating said pellets from the upper of said two plates to be welded; and
   means connected with said pellets to effect simultaneous firing operation thereof and welding of said plates in contact one with the other by explosive force therefrom through said layer.

2. An explosive spot welding system as defined in claim 1, wherein said explosive pellets are each provided with a tetryl charge of between one and two grams per cubic centimeter of volume, and wherein the acute angle between the plates is less than five degrees.

3. An explosive spot welding system as defined in claim 1, wherein said explosive pellets are tetryl charged and positioned at least three inches apart along the length of said overlap to provide a line of spot welds, and wherein the acute angle between the plates is between one and two degrees.

4. An explosive spot welding sysetm as defined in claim 1, wherein:
   said means for maintaining said plates on said base block at a predetermined relatively small acute angle one with respect to the other includes a spring-biased holding rod engaging the upper one of said plates above the contacting intersection of said plates, and disposable edgewise-mounted strip spacing means separating said elements and maintaining said angle.

5. An explosive spot welding system as defined in claim 1, wherein said acute angle is formed with one edge of the upper one of said plates contacting a surface of the lower one of said plates between the edges thereof, and further comprising:
   a spacer block supported by said base block positioned a predetermined relatively short distance from the lower one of said plates to prevent the deformation of said upper plate upon detonation.

6. An explosive spot welding system as defined in claim 4, wherein said acute angle is formed with one edge of the upper one of said elements contacting a surface of the lower one of said elements between the edges thereof, and further comprising:
   a spacer block supported by said base block positioned a predetermined relatively short distance from the lower one of said elements to prevent the deformation of said upper element upon detonation.

7. The method for making an explosive spot weld between two flat relatively thin aluminum alloy plates comprising:
   providing an anvil element for absorbing excess force in the welding operation;
   supporting said plates on said anvil element with two edges in overlapping relation one above the other;
   maintaining said plates at a predetermined relatively small acute angle to less than five degrees one with respect to the other and with one edge of one plate linearly contacting the adjacent surface of the other plate;
   positioning a series of explosive tetryl-charged pellets over and along the weld area constituted by the overlap of said plate edges to provide a line of spot welds;
   separating said pellets from the upper of said two plates to be welded by a protective layer of firm relatively thick material; and
   simultaneously firing said pellets to effect welding of said plates in contact one with the other by explosive force therefrom through said layer.

8. The method for making an explosive spot weld as defined in claim 7, wherein said plates are maintained at a predetermined relatively-small acute angle of less than five degrees one with respect to the other and with one edge of the upper one of said plates linearly contacting the adjacent surface of the lower one of said plates, and further comprising, prior to said firing operation step:
   positioning a spacer block upon said anvil element and separated a predetermined relatively short distance from the lower one of said plates to prevent the deformation of said upper plate upon welding.

9. An explosive spot welding system for welding two flat plate members of relatively thin aluminum alloy one on top of the other with two edges in overlapping relation, comprising in combination:
   a thick heavy metal base block providing a relatively large mass and anvil means for the welding operation and for supporting said plates in said overlapping relation with a relatively narrow overlap and weld area extending longitudinally of said plates;
   detachable means for resiliently holding said plates on said base block in said relation and including a removable spring-biased holding rod extending longitudinally over the top plate and along said overlap and weld area;
   disposable strip cardboard-type spacing means separating and holding said plates at a predetermined relatively small acute angle one with respect to the other and with one edge of the upper one of said plates engaging with a face of the lower one of said plates along a predetermined line of contact intermediate between the edges of said other plate;
   a spacer block supported by said base block positioned a predetermined relatively short distance from the lower one of said plates to prevent the deformation of said upper plate upon detonation;
   at least one explosive tetryl pellet containing a charge of between one and two grams per cubic centimeter and positioned over said overlap and weld area;
   a relatively thick strip slightly resilient hard-rubber-like material providing a protective layer separating said explosive pellet from the upper surface of said top plate;
   an electric detonator element connected with said pellet to effect a firing operation thereof and welding of said plates in contact one with the other by explosive force therefrom through said layer; and means connected with said detonator element for applying a firing current thereto.

References Cited

UNITED STATES PATENTS

| | | | |
|---|---|---|---|
| 3,281,930 | 11/1966 | Fordham | 29—470.1 |
| 3,316,627 | 5/1967 | Suzuki et al. | 29—470.1 |
| 3,377,010 | 4/1968 | Suzuki et al. | 228—3 |
| 3,377,693 | 4/1968 | Fukumoto | 29—470.1 |
| 3,434,197 | 3/1969 | Davenport | 29—470.1 |

OTHER REFERENCES

"Explosive Welding Aluminum," Welding Kaiser Aluminum, pp. 18–8 to 18–13, copyright 1967 by Kaiser Aluminum & Chemical Sales, Inc. Article based on paper "Explosive Welding," by Donald F. Davenport, presented 1961–62 ASTME Seminar.

JOHN F. CAMPBELL, Primary Examiner

R. J. SHORE, Assistant Examiner

U.S. Cl. X.R.

29—486, 497.5